(12) United States Patent
Woo

(10) Patent No.: US 10,261,331 B2
(45) Date of Patent: Apr. 16, 2019

(54) STEREOSCOPIC IMAGE DISPLAY DEVICE AND DRIVING METHOD THEREOF

(75) Inventor: Jonghoon Woo, Gyeonggi-do (KR)

(73) Assignee: LG Display Co., Ltd., Seoul (KR)

(*) Notice: Subject to any disclaimer, the term of this patent is extended or adjusted under 35 U.S.C. 154(b) by 1665 days.

(21) Appl. No.: 13/334,413

(22) Filed: Dec. 22, 2011

(65) Prior Publication Data

US 2013/0002652 A1 Jan. 3, 2013

(30) Foreign Application Priority Data

Jun. 28, 2011 (KR) .................. 10-2011-0063091

(51) Int. Cl.
*G02B 27/26* (2006.01)
*H04N 13/337* (2018.01)
*H04N 13/341* (2018.01)
*H04N 13/356* (2018.01)
*H04N 13/30* (2018.01)

(52) U.S. Cl.
CPC .......... *G02B 27/26* (2013.01); *H04N 13/337* (2018.05); *H04N 13/341* (2018.05); *H04N 13/356* (2018.05); *H04N 2013/403* (2018.05)

(58) Field of Classification Search
CPC ............. H04N 5/7775; H04N 13/0497; H04N 13/0239
USPC .............................. 386/230, 239; 348/42, 51
See application file for complete search history.

(56) References Cited

U.S. PATENT DOCUMENTS

| | | | | |
|---|---|---|---|---|
| 5,162,897 A | * | 11/1992 | Jitsukata | G02B 27/26 348/58 |
| 2010/0289884 A1 | | 11/2010 | Kang | |
| 2010/0309381 A1 | * | 12/2010 | Nakagawa | H04N 13/0438 348/705 |
| 2011/0015486 A1 | * | 1/2011 | Yamamoto | A61B 1/00009 600/109 |
| 2011/0050871 A1 | * | 3/2011 | Lee | G02B 27/26 348/58 |
| 2011/0148938 A1 | | 6/2011 | Yang | |
| 2011/0149028 A1 | * | 6/2011 | Klebanov | H04N 13/341 348/43 |
| 2011/0255019 A1 | * | 10/2011 | Son | G02B 27/2242 349/15 |

(Continued)

FOREIGN PATENT DOCUMENTS

| | | |
|---|---|---|
| CN | 101841684 A | 9/2010 |
| CN | 101888564 A | 11/2010 |
| KR | 20100123267 A | 11/2010 |

OTHER PUBLICATIONS

Chinese Office Action dated Mar. 5, 2014 for Chinese patent application No. 201110442255.X.

(Continued)

*Primary Examiner* — Mishawn N Hunter
(74) *Attorney, Agent, or Firm* — Morgan, Lewis & Bockius LLP

(57) ABSTRACT

Provided is a stereoscopic image display device which comprises: an image control unit for outputting a left eye image and a right eye image; an image panel for displaying the left eye image and the right eye image; and glasses consisting of a left eye glass and a right eye glass which have the same transmissive characteristic to transmit only one of the left eye image and the right eye image displayed on the image panel.

18 Claims, 8 Drawing Sheets

(56) References Cited

U.S. PATENT DOCUMENTS

| | | | | |
|---|---|---|---|---|
| 2011/0279450 A1* | 11/2011 | Seong | ................... | G09G 3/003 |
| | | | | 345/419 |
| 2011/0279659 A1* | 11/2011 | Jung | ................... | G09G 3/3648 |
| | | | | 348/54 |
| 2011/0285816 A1* | 11/2011 | Miyazaki | ........... | G02B 27/2264 |
| | | | | 348/43 |
| 2011/0304616 A1* | 12/2011 | Ham | .................. | G02B 27/0093 |
| | | | | 345/419 |
| 2012/0007959 A1* | 1/2012 | Kwon | ................ | H04N 13/0022 |
| | | | | 348/51 |

OTHER PUBLICATIONS

Office Action dated Jul. 26, 2017 from the Korean Intellectual Property Office in related Korean application No. 10-2011-0063091.

* cited by examiner (a)  (b)

USR1

USR2

USR1

USR2

STEREOSCOPIC IMAGE DISPLAY DEVICE AND DRIVING METHOD THEREOF

This application claims the benefit of Korean Patent Application No. 10-2011-0063091 filed on Jun. 28, 2011, which is hereby incorporated by reference.

BACKGROUND

Field

This document relates to a stereoscopic image display device and a driving method thereof.

Description of the Related Art

Stereoscopic image display devices are classified by a stereoscopic technique and an autostereoscopic technique.

The stereoscopic technique uses parallax images of left and right eyes that have a large stereoscopic effect. The stereoscopic technique is divided into a glasses method and a glasses-free method, both of which have been put to practical use. The glasses method displays left and right parallax images on a direct-view-type liquid crystal display panel or projector in a time division manner in a reversed polarization direction and provides a stereoscopic image through polarizing glasses or liquid crystal shutter glasses. The glasses-free method generally installs an optical plate for separating an optical axis of left and right parallax images, such as a parallax barrier, before or behind a liquid crystal display panel.

In the case of the glasses method which is adopted by some of the stereoscopic image display devices, a user can view a 3-dimensional image when wearing glasses and view a 2-dimensional image when taking off glasses. Recently, as great emphasis is placed on personal privacy protection and business information security, the stereoscopic image display device using the glasses method may also need such a characteristic.

Accordingly, the conventional stereoscopic image display device using the glasses method are required to display the stereoscopic image as well as prevent other people from viewing the image.

SUMMARY

According to an aspect of this document, there is provided a stereoscopic image display device which comprises: an image control unit for outputting a left eye image and a right eye image; an image panel for displaying the left eye image and the right eye image; and glasses consisting of a left eye glass and a right eye glass which have the same transmissive characteristic to transmit only one of the left eye image and the right eye image displayed on the image panel.

In addition, according to another aspect of this document, there is provided a driving method of a stereoscopic image display device, which comprises: an input step of receiving an input of a user control signal from the outside; an image processing step of creating either a left eye image or a right eye image as effective image information and the other image as ineffective image information, when the user control signal is input; and a display step of displaying the left eye image and the right eye image on an image panel, wherein the image displayed on the image panel is viewed through glasses consisting of a left eye glass and a right eye glass which have the same transmissive characteristic to transmit only one of the left eye image and the right eye image.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention.

DETAILED DESCRIPTION

Reference will now be made in detail embodiments of the invention examples of which are illustrated in the accompanying drawings.

Hereinafter, exemplary embodiments of the present invention will now be described in detail with reference to the accompanying drawings.

Figure 1:
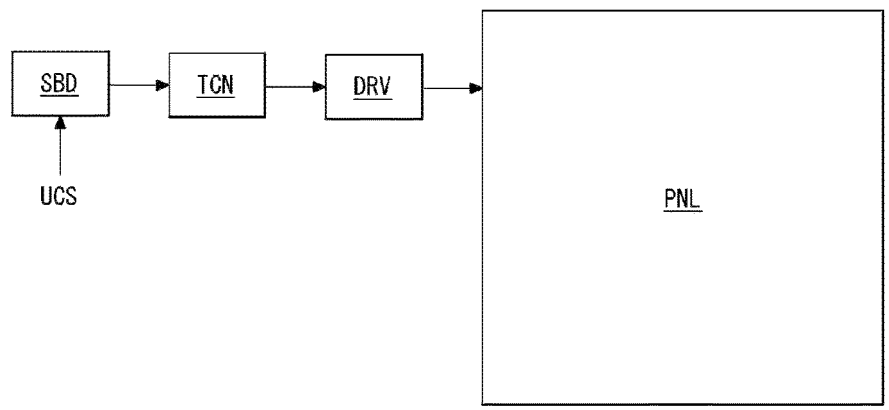
FIG. 1 is a schematic configuration view showing a stereoscopic image display device.
Figure 1:
Figure 2:
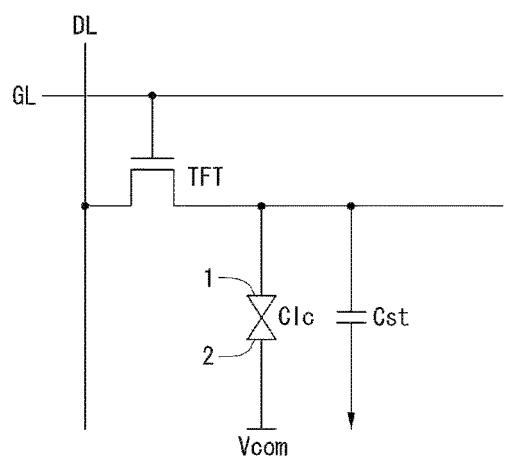
FIG. 2 is an exemplary view showing circuit configuration of a sub-pixel included in an image panel.
Figure 3:
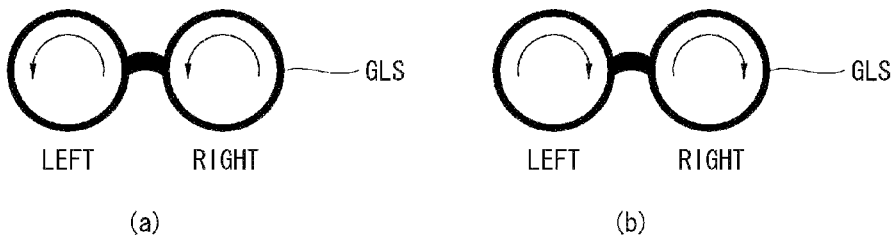
FIG. 3 is an exemplary view showing a polarizing characteristic of glasses.

FIG. 1 is a schematic configuration view showing a stereoscopic image display device, FIG. 2 is an exemplary view showing circuit configuration of a sub-pixel included in an image panel, and FIG. 3 is an exemplary view showing a polarizing characteristic of glasses.

As shown in FIGS. 1 to 3, the stereoscopic image display device includes an image control unit SBD, a timing control unit TCN, a driving unit DRV, an image panel PNL, and glasses GLS.

The image control unit SBD generates a 2-dimensional image (hereinafter, referred to as '2D image') in a 2-dimensional mode (hereinafter, referred to as '2D mode'), a 3-dimensional image (hereinafter, referred to as '3D image') in a 3-dimensional mode (hereinafter, referred to as '3D mode'), and a user image (hereinafter, referred to as 'protective image') in a user mode (hereinafter, referred to as 'protective mode'). Here, the protective image is defined as an image for protecting or keeping user's information during the protective mode operation.

Unlike the 2D image, the 3D image contains a left eye image and a right eye image through frame packing, side-by-side, top & down, frame sequential, etc. Therefore, when the 3D image is input from the outside, the image control unit SBD processes this image to change a format to an interleaved format or a frame sequential format. Meanwhile, the protective image is based on the 3D image. Thus, when a user control signal UCS is input to execute the protective mode, the image control unit SBD processes an image to create either a left eye image or a right eye image, which is included in a 3D image, as effective image information and the other image as ineffective image information. This protective image will be further described below in more detail.

The image control unit SBD supplies the timing control unit TCN with timing signals such as a vertical synchronous signal Vsync, a horizontal synchronous signal Hsync, a data enable signal DE, a main clock Main Clock, etc. as well as 2D, 3D and protective images.

The image control unit SBD selects the 2D, 3D or protective mode according to the user's selection input through a user input unit (user interface), generates an image corresponding to the selected mode, processes the image, and supplies the image to the timing control unit TCN. The user input unit may include a user input means such as a on screen display (OSD), a remote controller, a keyboard, a mouse, etc.

The timing control unit TCN receives the 2D, 3D or protective image from the image control unit SBD and supplies this image to the driving unit DRV together with various signals associated with this image. The timing control unit TCN controls the driving unit DRV using various signals.

The driving unit DRV includes a data driving unit connected to data lines to supply a data signal and a gate driving unit connected to gate lines to supply a gate signal. The data driving unit included in the driving unit DRV converts a left eye image and a right eye image of a digital format into an analog format under the control of the timing control unit TCN and supplies the resulting images to the data lines. In addition, the gate driving unit included in the driving unit DRV supplies the gate signal to the gate lines in sequential order under the control of the timing control unit TCN.

The image panel PNL receives the gate signal and the data signal from the driving unit DRV and displays the 2D, 3D or protective image according to the signals. The image panel PNL includes a panel consisting of sub-pixels SP shown in FIG. 2.

The panel consisting of the sub-pixels SP shown in FIG. 2 is a liquid crystal display panel. The sub-pixels SP of the liquid crystal display panel include a red sub-pixel, a green sub-pixel, and a blue sub-pixel. As shown in FIG. 2, the general circuit configuration of one sub-pixel includes a thin film transistor TFT, a storage capacitor Cst, and a liquid crystal layer Clc. The thin film transistor TFT has a source electrode connected to the data line DL supplied with the data signal and also has a gate electrode connected to the gate line GL supplied with the gate signal. And, the storage capacitor Cst and the liquid crystal layer Clc are connected to a drain electrode of the thin film transistor TFT, and supplied with a common voltage through a common voltage wiring.

In this configuration, the liquid crystal layer Clc is driven by a differential between a data voltage supplied to a pixel electrode 1 and a common voltage supplied to the common electrode 2. The common electrode is provided on a color filter substrate in a vertical driving method such as a twisted nematic (TN) mode and a vertical alignment (VA) mode, while it is provided on a TFT substrate in a horizontal driving method such as an in plane switching (IPS) mode and a fringe field switching (FFS) mode together with the pixel electrode 1.

The liquid crystal mode of the liquid crystal display panel can be implemented as any kind of liquid crystal mode, in addition to the TN mode, the VA mode, the IPS mode, and the FFS mode. A lower polarizing plate and an upper polarizing plate are attached respectively to the TFT substrate and the color filter substrate of the liquid crystal display panel. The liquid crystal display panel with this configuration can display an image by light supplied from a backlight unit.

The glasses GLS are glasses for controlling the protective image, which transmit only one of the left eye image and the right eye image displayed on the image panel PNL, i.e., the effective image. The glasses GLS used to control the protective image (hereinafter, continuously referred to as 'glasses') consist of a left eye glass LEFT and a right eye glass RIGHT having the same transmissive characteristic. The left eye glass LEFT and the right eye glass RIGHT of the glasses GLS have the same left polarizing characteristic as shown in FIG. 3(a) or have the same right polarizing characteristic as shown in FIG. 3(b).

While FIG. 3 shows the glasses GLS having the left or right polarizing characteristic as an example, it may vary according to a polarization state of an image output from the image panel PNL. However, the left eye glass LEFT and the right eye glass RIGHT have the same transmissive characteristic. And, the glasses GLS may be provided as polarizing glasses or liquid crystal shutter glasses according to the configuration of the image panel PNL.

In the meantime, while the above description provides the panel consisting of the backlight unit and the liquid crystal display panel as an example, any kind of panel which can display an image is possible, such as an organic electroluminescent display panel, a plasma display panel, a field emission display panel, etc. However, for convenience of explanation, the present invention will be described using the liquid crystal display panel.

Hereinafter, an image presenting system of the stereoscopic image display device according to the exemplary embodiment of the present invention will now be described in more detail.

Figure 4:
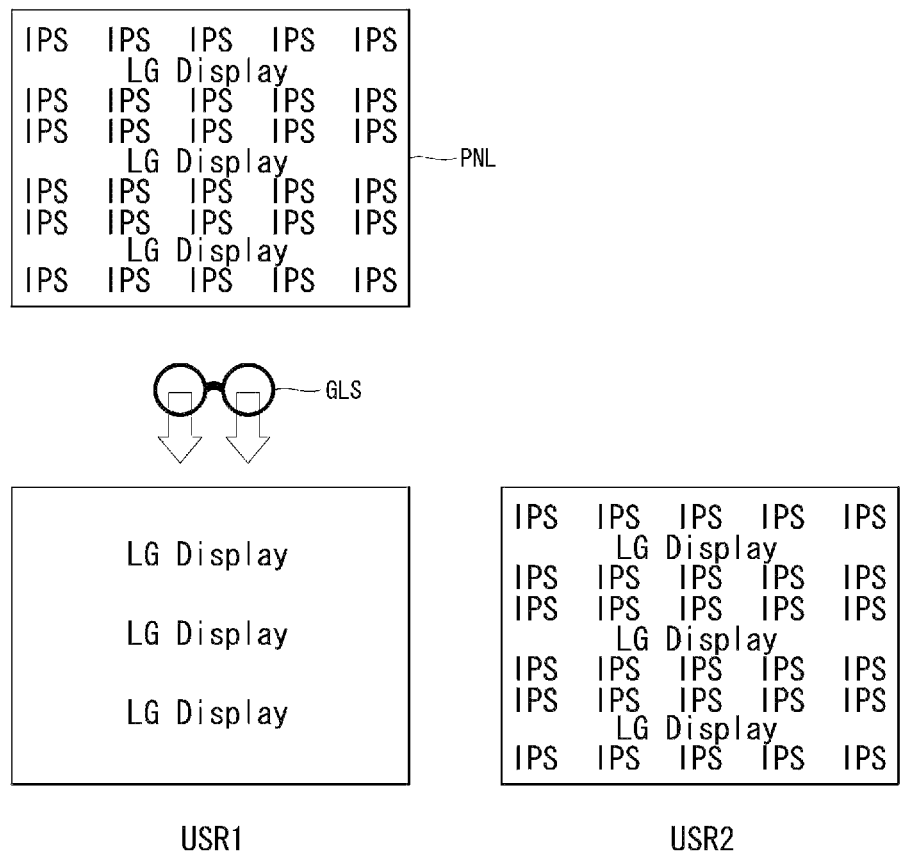
FIG. 4 is a concept view for explaining an image presenting system of a stereoscopic image display device according to an exemplary embodiment of the present invention.
Figure 5:
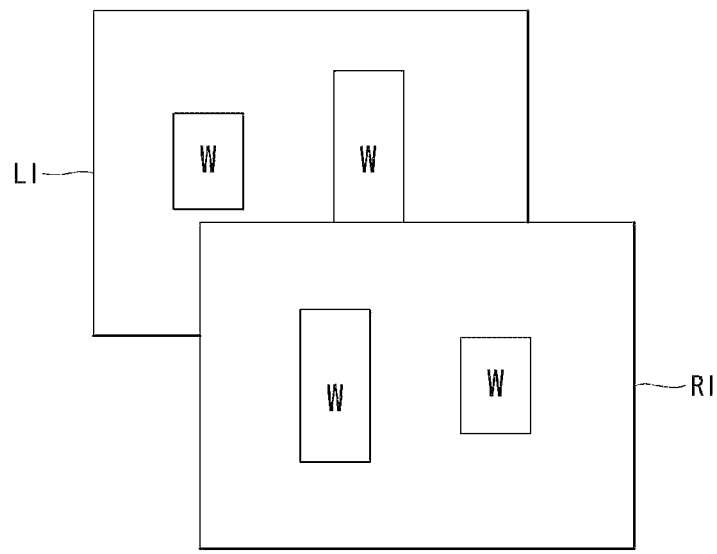
FIG. 5 is a view for explaining a method of creating a protective image through positive/negative gray scale compensation.
Figure 6:
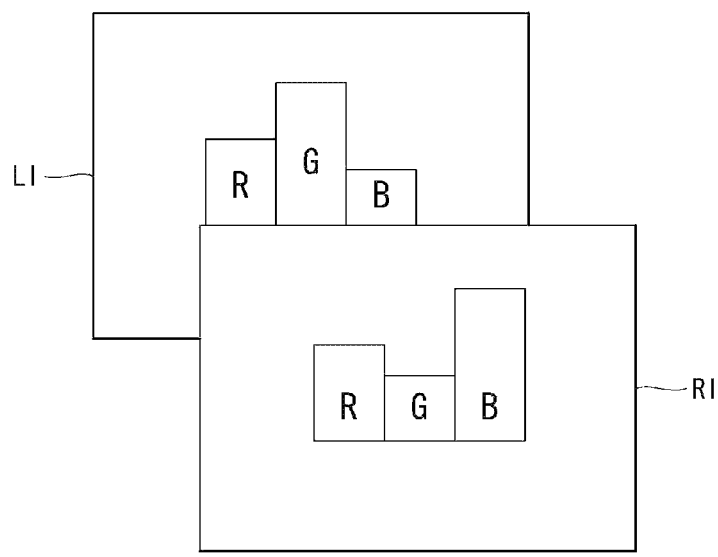
FIG. 6 is a view for explaining a method of creating a protective image through color gray scale compensation.
Figure 7:
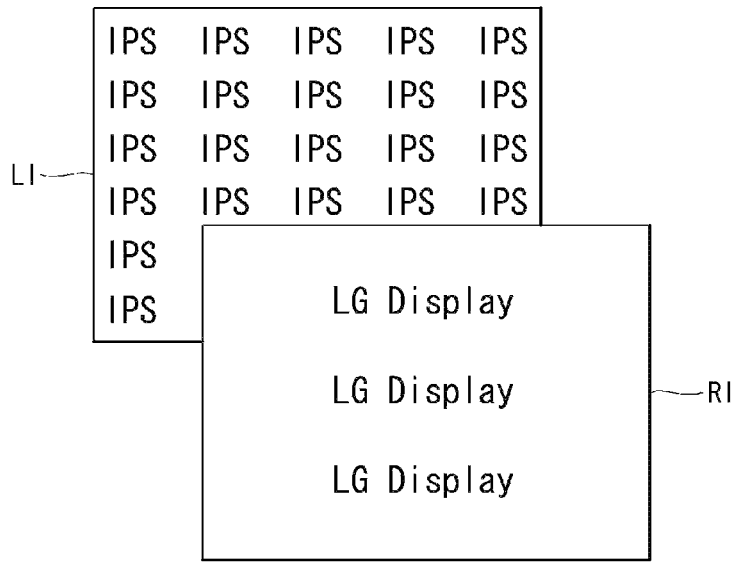
FIG. 7 is a view for explaining a method of creating a protective image through background character insertion.
Figure 8:
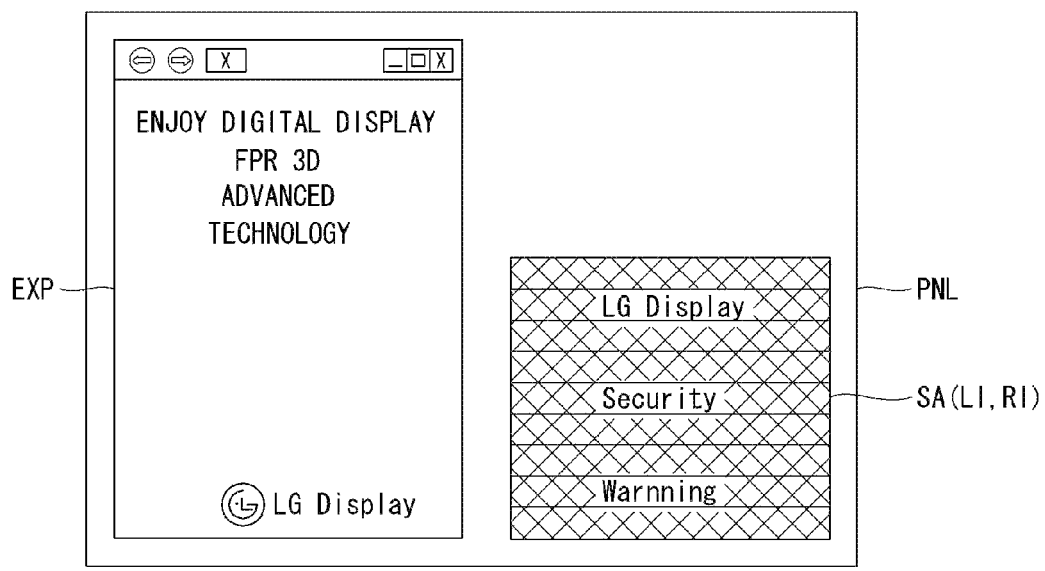
FIG. 8 is a view for explaining a method of creating a protective image through selective area control.

FIG. 4 is a concept view for explaining the image presenting system of the stereoscopic image display device according to the exemplary embodiment of the present invention, FIG. 5 is a view for explaining a method of creating a protective image through positive/negative gray scale compensation, FIG. 6 is a view for explaining a method of creating a protective image through color gray scale compensation, FIG. 7 is a view for explaining a method of creating a protective image through background character insertion, and FIG. 8 is a view for explaining a method of creating a protective image through selective region control.

As shown in FIG. 4, when the protective image is displayed on the image panel PNL of the stereoscopic image display device according to the exemplary embodiment of the present invention, a user USR1 wearing the glasses GLS views an effective image LG Display. On the contrary, a user USR2 taking off the glasses GLS views an ineffective image (a mixed image of LG Display and IPS).

The reason why the two users USR1 and USR2 view different images is that the image control unit SBD creates a left eye image and a right eye image as effective image information and ineffective image information, respectively, and displays them on the image panel PNL. Therefore, the user USR1 wearing the glasses GLS views the effective image LG Display because only one of the left eye image and the right eye image (i.e., an image containing only the effective image information) is transmitted, while the user USR2 taking off the glasses GLS views the ineffective image (a mixed image of LG Display and IPS) because both the left eye image and the right eye image (a mixed image of effective and ineffective image information) are transmitted.

Meanwhile, the image control unit SBD can use the following methods to create the left eye image and the right eye image as the effective image information and the ineffective image information, respectively.

As shown in FIG. 5, the image control unit SBD can process an image using gray scale compensation, which compensates for a negative/positive (black/white) gray scale of either the left eye image L1 or the right eye image R1 to create the image as ineffective image information.

According to this method, the image control unit SBD compensates for the white W (or black) gray scales of the left eye image L1 and the right eye image R1 in a reversed manner, so that one image is created as effective image information but the other image is created as ineffective image information.

As shown in FIG. 6, the image control unit SBD can process an image using color (R, G, B) gray scale compensation, which compensates for a color gray scale of either the left eye image L1 or the right eye image R1 to create the image as ineffective image information.

According to this method, the image control unit SBD compensates for the color (R, G, B) gray scales of the left eye image L1 and the right eye image R1 in a reversed manner, so that one image is created as effective image information but the other image is created as ineffective image information.

As shown in FIG. 7, the image control unit SBD can process an image using background character insertion, which sets either the left eye image L1 or the right eye image R1 as a background and inserts a character into the background to create the image as ineffective image information.

According to this method, either the left eye image L1 or the right eye image R1 becomes the foreground and is created as effective image information, while the other image becomes the background, into which the character is inserted, and is created as ineffective image information.

As shown in FIG. 8, the image control unit SBD can process an image using selective area control, which defines part of the image panel PNL as a selective area SA and creates either the left eye image L1 or the right eye image R1, which is displayed in the selective area, as ineffective image information.

According to this method, either the left eye image L1 or the right eye image R1 displayed in the selective area SA is created as effective image information, while the other image is created as ineffective image information. In the case of this method, any one of the methods of FIGS. 5 to 7 or a combination thereof may be used.

As described above, when the left eye image L1 and the right eye image R1 are created as the effective image information and the ineffective image information and displayed on the image panel PNL, the users taking off the glasses GLS cannot normally view the effective image on the screen, which results in the protection of the user's privacy and security, etc. On the contrary, since an image in an explorer area EXP is not created as effective image information and ineffective image information, both the user with the glasses GLS and the user without the glasses GLS can view this image.

Therefore, the user wearing the glasses GLS can secretly perform a variety of tasks, such as a document, moving picture, messenger, chatting, game, internet, development tool, etc.

As discussed earlier, the image control unit SBD processes an image using any one of the methods of FIGS. 5 to 8 or a combination thereof to create the left eye image and the right eye image as the effective image information and the ineffective image information, respectively.

The image control unit SBD can be provided in the following configuration to process an image to be supplied to the image panel PNL as in the above.

Figure 9:
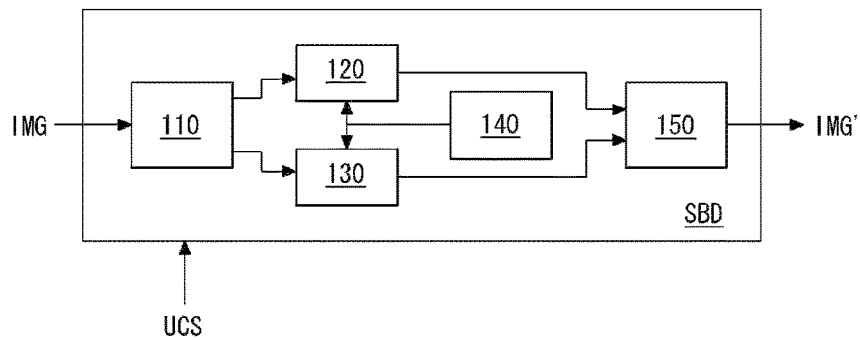
FIG. 9 is a schematic configuration view showing image processing units.

FIG. 9 is a schematic configuration view showing image processing units.

As shown in FIG. 9, the image control unit SBD includes image processing units 110 to 150 such as an image separating unit 110, a left eye image processing unit 120, a right eye image processing unit 130, an image compensating unit 140, and an image restoring unit 150.

When the user control signal UCS is input, the image separating unit 110 separates an image signal IMG, which is supplied from the outside, into a left eye image and a right eye image to create a protective image, and transfers the left eye image and the right eye image to the left eye image processing unit 120 and the right eye image processing unit 130, respectively.

The left eye image processing unit 120 and the right eye image processing unit 130 create the separated left and right eye images as effective image information and ineffective image information, respectively, in cooperation with the image compensating unit 140.

To this end, at least one of the left eye image processing unit 120 and the right eye image processing unit 130 creates the ineffective image information, using any one of color information, image information and character information or a combination thereof, in cooperation with the image compensating unit 140 so that the ineffective image information can have a different format from the effective image information. Here, the left eye image processing unit 120 and the right eye image processing unit 130 process an image using any one of the methods of FIGS. 5 to 8 or a combination thereof to create the left eye image and the right eye image as the effective image information and the ineffective image information, respectively.

The image restoring unit 150 restores the protective image, which is processed by the left eye image processing unit 120 and the right eye image processing unit 130, to the original image signal IMG' and outputs it.

In the above description, each of the image processing units 110 to 150 included in the image control unit SBD is explained for better understanding. However, it would be appreciated that two or more of the image processing units can be incorporated into an on-demand integrated circuit or a programming logic chip.

In addition, in the above description, when the user control signal UCS is input, the image separating unit 110 separates the image signal IMG, which is supplied from the outside, to create the protective image. However, if the image separation is not needed during the image processing, the image separating unit 110 and the image restoring unit 150 can be omitted.

The stereoscopic image display device can be driven as follows using the image processing units 110 to 150 described above.

Figure 10:
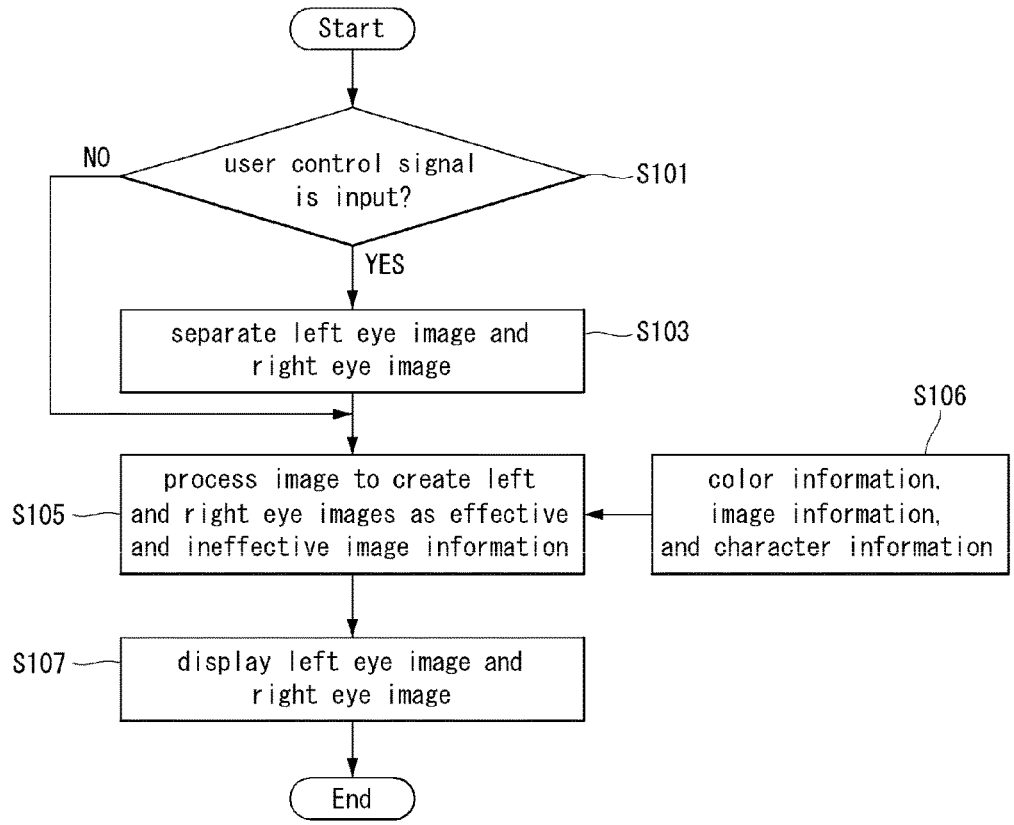
FIG. 10 is a flowchart showing sequential steps of a driving method of a stereoscopic image display device.

FIG. 10 is a flowchart showing sequential steps of a driving method of a stereoscopic image display device.

As shown in FIG. 10, the driving method of the stereoscopic image display device includes an input step S101, an image separating step S103, an image processing step S105, and a display step S107 in sequential order.

The input step S101 is a step of receiving an input of a user control signal from the outside. If the user control signal is input (YES), an image is processed, e.g., separated to create a protective image. If the user control signal is not input (NO), the routine goes to the display step S107 to display a 3D image without the image processing. Here, the image processing procedure of the protective image is explained, but the image processing procedure of the 3D image is not explained.

The image separating step S103 is a step of separating the image into a left eye image and a right eye image to process them separately.

The image processing step S105 is a step of creating either the left eye image or the right eye image as effective image information and the other image as the ineffective image information. In this step, the left eye image and the right eye image are created as the effective image information and the ineffective image information, respectively, based on the compensating step S106 including various compensating methods (as shown in FIGS. 4 to 8) using color information, image information, character information, etc.

The display step S107 is a step of displaying the left eye image and the right eye image, which are created as the effective image information and the ineffective image information in the image processing step S105, i.e., the protective image on an image panel.

Here, only the user wearing glasses can view the effective image of the protective image displayed on the image panel because the glasses consist of a left eye glass and a right eye glass which have the same transmissive characteristic to transmit only one of the left eye image and the right eye image.

As described above, the stereoscopic image display device according to the exemplary embodiment of the present invention displays the protective image when the user control signal is input, but displays either the 2D image or the 3D image when the user control signal is not input.

In the meantime, the stereoscopic image display device according to the exemplary embodiment of the present invention can present the 3D image as well as the protective image using one of a patterned retarder, an active retarder, and liquid crystal shutter glasses, the configuration of which will now be briefly described.

Figure 11:
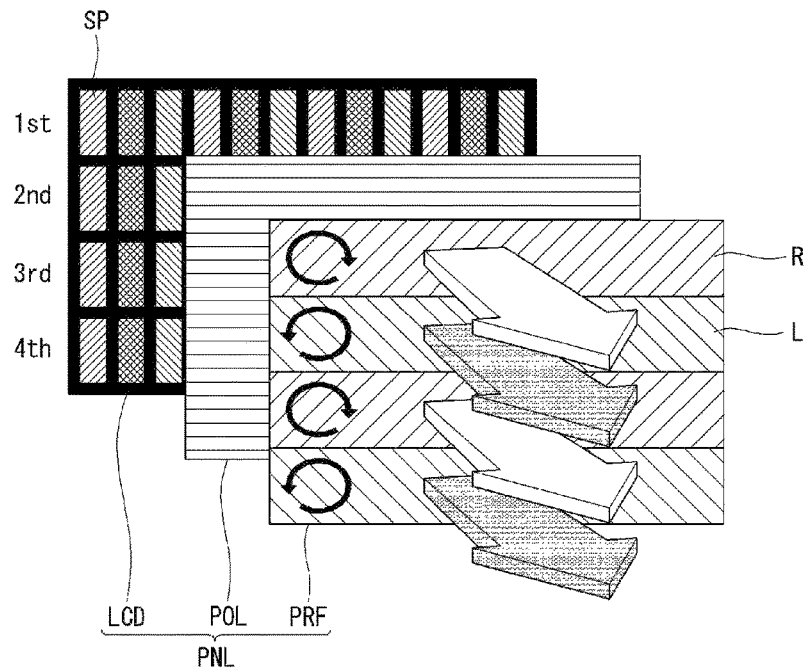
FIGS. 11 and 12 are views for explaining a stereoscopic image display device including a patterned retarder.
Figure 12:
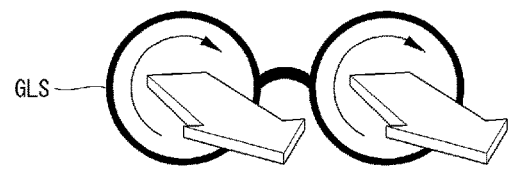
Figure 12:
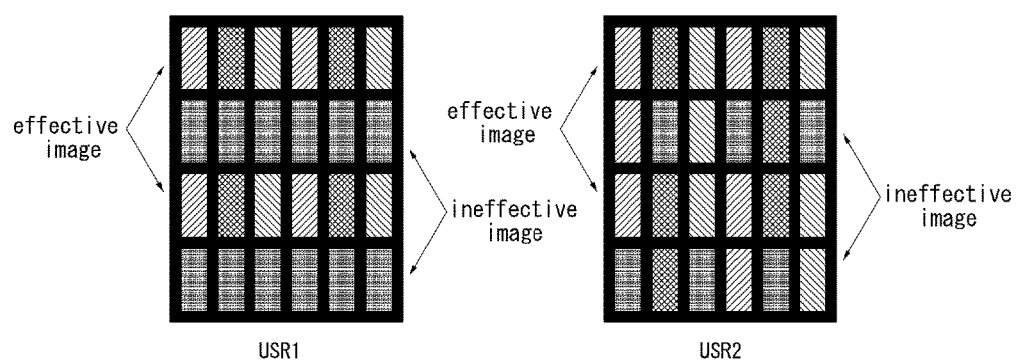

FIGS. 11 and 12 are views for explaining a stereoscopic image display device including a patterned retarder.

As shown in FIGS. 11 and 12, an image panel PNL of the stereoscopic image display device including the patterned retarder includes a liquid crystal panel LCD, a polarizing plate POL, a patterned retarder PRF, and glasses GLS. Here, SP denotes a sub-pixel of the liquid crystal panel LCD, and $1^{st}$ to $4^{th}$ denote scan lines.

In this method, the glasses GLS are polarizing glasses consisting of a left eye glass and a right eye glass which have the same transmissive characteristic to transmit only one of a left eye image and a right eye image.

The patterned retarder PRF is attached to the liquid crystal panel LCD and has a structure in which first polarizing lines are separated from second polarizing lines. The first polarizing lines R are disposed to perform the right (or left) polarization, while the second polarizing lines L are disposed to perform the left (or right) polarization.

The patterned retarder PRF displays the left eye image and the right eye image, which are displayed on the liquid crystal panel LCD, in an interlaced manner, mixing them in scan line directions ($1^{st}$ to $4^{th}$) line by line. For this, odd-number lines of the patterned retarder PRF are disposed to perform the right polarization R, while even-number lines thereof are disposed to perform the left polarization L (or vice versa), thus polarizing and separating the image displayed on the liquid crystal panel LCD.

In the case of the stereoscopic image display device including the patterned retarder PRF, since the patterned retarder PRF has the above-described characteristics, the image displayed on the liquid crystal panel LCD is separately displayed as the left eye image and the right eye image (or vice versa) in line units. Alternatively, in order to prevent loss of the image, the liquid crystal panel LCD may alternately display the left eye image and the right eye image in frame units.

In this configuration, when the protective image is displayed on the image panel PNL, the user USR1 wearing the glasses GLS views only the effective image, while the user USR2 taking off the glasses GLS views a mixed image of the effective and ineffective images.

Figure 13:
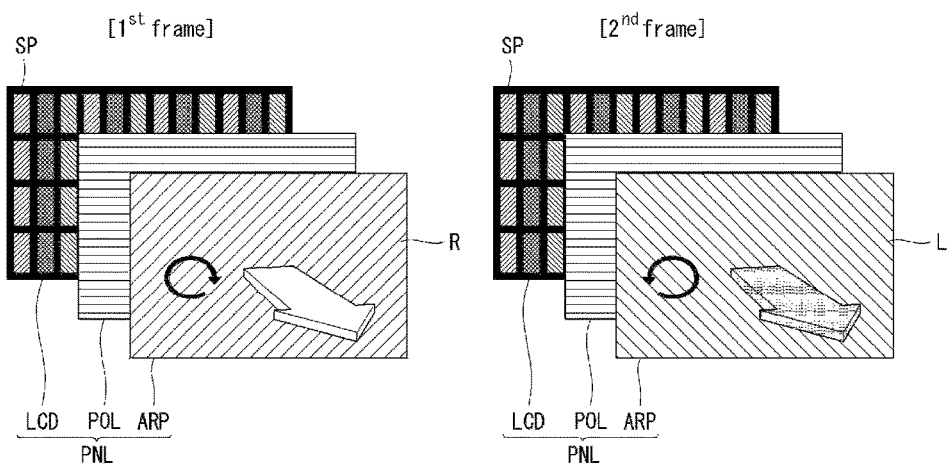
FIGS. 13 and 14 are views for explaining a stereoscopic image display device including an active retarder.
Figure 14:
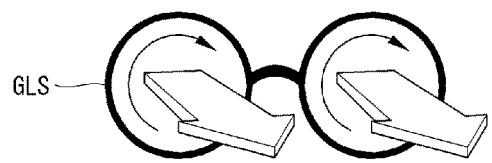
Figure 14:
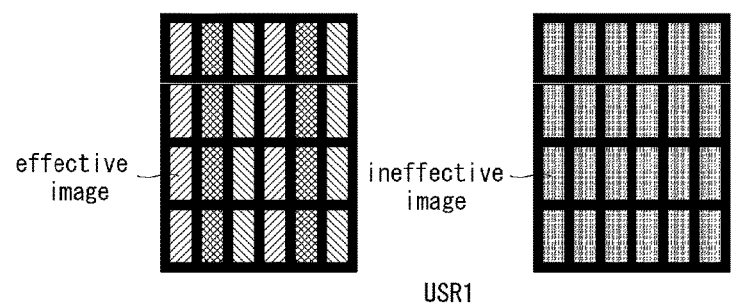
Figure 14:
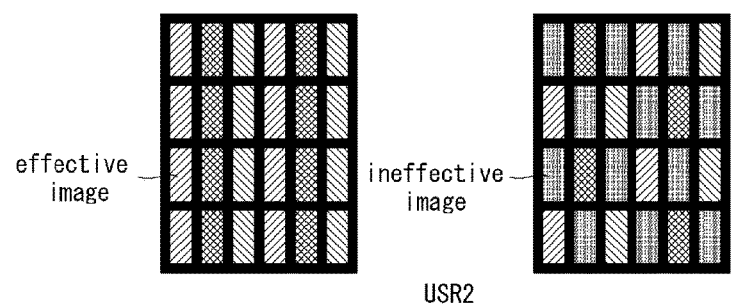

FIGS. 13 and 14 are views for explaining a stereoscopic image display device including an active retarder.

As shown in FIGS. 13 and 14, an image panel PNL of the stereoscopic image display device including the active retarder includes a liquid crystal panel LCD, a polarizing plate POL, an active retarder ARF, and glasses GLS.

In this method, the glasses GLS are polarizing glasses consisting of a left eye glass and a right eye glass which have the same transmissive characteristic to transmit only one of a left eye image and a right eye image.

The active retarder ARF is attached to the liquid crystal panel LCD and has a structure in which first polarization R and second polarization L alternate with each other in frame units. The first polarization R is disposed to perform the right (or left) polarization, while the second polarization L is disposed to perform the left (or right) polarization, which are driven under the control of a timing control unit.

The active retarder ARF adopts the frame sequential format to transmit the right eye image in a first frame [$1^{st}$ frame] and the left eye image in a second frame [$2^{nd}$ frame]. For this, the active retarder ARF performs an OFF (λ2) operation for the first polarization R and an ON (0) operation for the second polarization L in frame units, so that the image displayed on the liquid crystal panel LCD is separately displayed as the left eye image and the right eye image (or vice versa) in frame units.

In the case of the stereoscopic image display device including the active retarder ARF, since the active retarder ARF has the above-described characteristics, the image displayed on the liquid crystal panel LCD is alternately displayed as the left eye image and the right eye image (or vice versa) in frame units.

In this configuration, when the protective image is displayed on the image panel PNL, the user USR1 wearing the glasses GLS views only the effective image, while the user USR2 taking off the glasses GLS views a mixed image of the effective and ineffective images.

Figure 15:
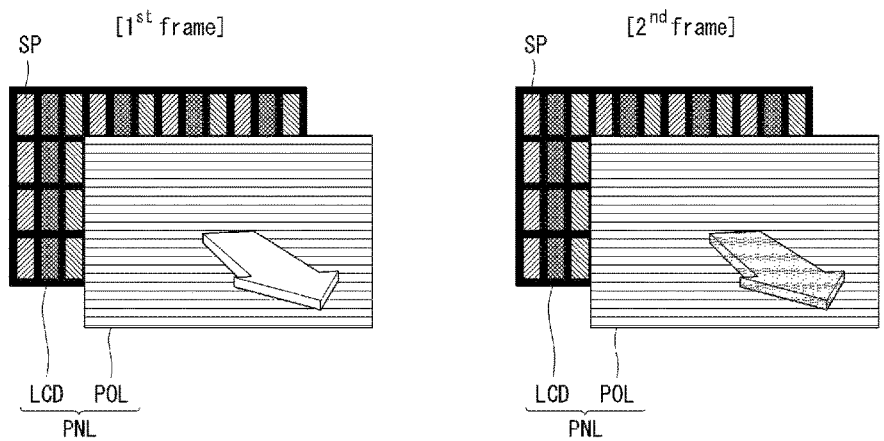
FIGS. 15 and 16 are views for explaining a stereoscopic image display device including liquid crystal shutter glasses.
Figure 16:
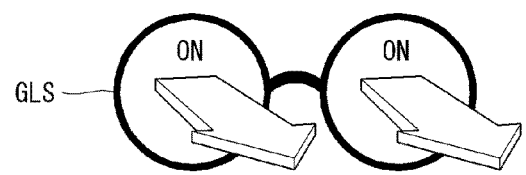
Figure 16:
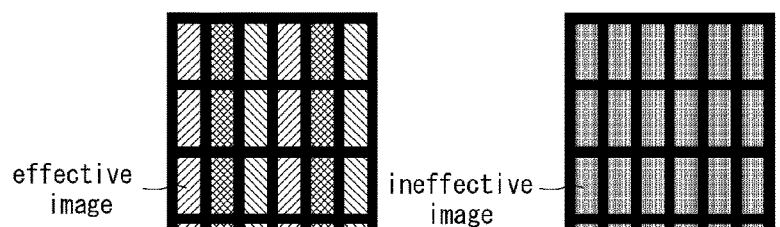
Figure 16:
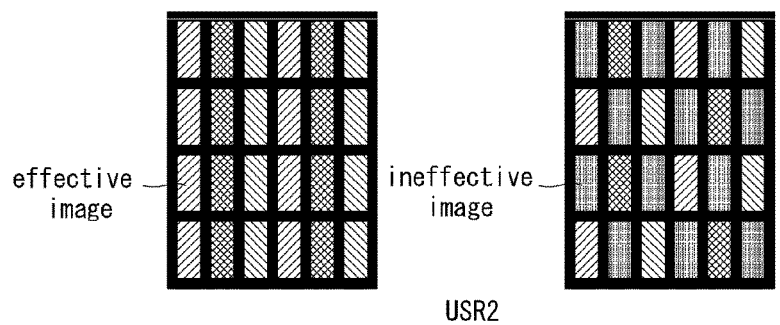

FIGS. 15 and 16 are views for explaining a stereoscopic image display device including liquid crystal shutter glasses.

As shown in FIGS. 15 and 16, an image panel PNL of the stereoscopic image display device including the liquid crystal shutter glasses includes a liquid crystal panel LCD, a polarizing plate POL, and glasses GLS.

In this method, the glasses GLS are liquid crystal shutter glasses which serve to separate an image like the active retarder, have the same transmissive characteristic, and perform an ON/OFF operation.

The glasses GLS are configured such that a left eye glass and a right eye glass are identically on/off in frame units to have the same transmissive characteristic and to separate a left eye image and a right eye image, which are driven under the control of an image control unit or a timing control unit.

The glasses GLS are on to transmit the right eye image (effective image) in a first frame [$1^{st}$ frame] and are off to intercept the left eye image (ineffective image) in a second frame [$2^{nd}$ frame]. The glasses GLS perform the ON/OFF operation to transmit only the effective image, so that the image displayed on the liquid crystal panel LCD is separately displayed as the left eye image and the right eye image (or vice versa) in frame units.

In this configuration, when the protective image is displayed on the image panel PNL, the user USR1 wearing the glasses GLS views only the effective image, while the user USR2 taking off the glasses GLS views a mixed image of the effective and ineffective images.

In the case of the stereoscopic image display device including the liquid crystal shutter glasses, it is possible to implement a display device for displaying a 3D image and a display device for controlling a protective image in one device by changing a signal input (3D mode, protective mode) on the system and controlling the ON time of the glasses for displaying the 3D image and the glasses for controlling the protective image.

Meanwhile, when the user control signal is not input, the stereoscopic image display device including the patterned retarder, the active retarder or the liquid crystal shutter glasses according to the present invention enables the user to view the 3D image by wearing the equipped glasses (consisting of a left eye glass and a right eye glass which have different transmissive characteristics). That is, both the glasses for viewing the stereoscopic image and the glasses for controlling the protective image are provided as the glasses GLS.

As discussed earlier, the present invention has an advantage in that it provides the stereoscopic image display device and the driving method thereof, which can improve personal privacy protection and special business security by enabling the viewing of both the stereoscopic image and the protective image (security image) through the glasses for viewing the stereoscopic image and the glasses for controlling the protective image. Moreover, the present invention has an advantage in that the stereoscopic image and the protective image can be used together, the protective image can be displayed with the minimized luminance loss, and costs can be reduced by not causing additional processes and expenses for creating the protective image.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A stereoscopic image display device, comprising:
    an image control unit for outputting a left eye image and a right eye image;
    an image panel for displaying the left eye image and the right eye image; and
    glasses including a left eye glass and a right eye glass which have the same transmissive characteristic,
    wherein the image panel includes:
        a panel for alternately displaying the left eye image and the right eye image in frame units; and
        an active retarder attached to the panel and having a first polarization and a second polarization which alternate with each other in frame units under the control of the control unit,
    wherein either the left eye image or the right eye image is created as effective image information, while the other image is created as ineffective image information,
    wherein the left eye glass transmits only one of the left eye image and the right eye image as the effective image information displayed on the image panel, and the right eye glass transmits only the other one of the left eye image and the right eye image as the effective image information.

2. The stereoscopic image display device of claim 1, wherein the ineffective image information is composed of any one of color information, image information and character information or a combination thereof which has a different format from the effective image information.

3. The stereoscopic image display device of claim 1, wherein the control unit comprises an image processing unit for creating the left eye image and the right eye image as the effective image information and the ineffective image information by the user's control.

4. The stereoscopic image display device of claim 1, wherein the control unit processes an image using any one or a combination of the gray scale compensation which compensates for a negative/positive gray scale of either the left eye image or the right eye image to create the image as ineffective image information, color gray scale compensation which compensates for a color gray scale of either the left eye image or the right eye image to create the image as ineffective image information, background character insertion which sets either the left eye image or the right eye image as a background and inserts a character into the background to create the image as ineffective image information, and selective area control which defines part of the image panel as a selective area and creates either the left eye image or the right eye image, which is displayed in the selective area, as ineffective image information, and supplies the image to the image panel.

5. The stereoscopic image display device of claim 1, wherein a user wearing the glasses views the effective image because only one of the left eye image and the right eye image is transmitted, while a user taking off the glasses views the ineffective image because both left eye image and the right eye image are transmitted.

6. The stereoscopic image display device of claim 1, wherein the panel separates the left eye image and the right eye image by odd-number lines and even-number lines and alternately displays the images in frame units.

7. The stereoscopic image display device of claim 1,
    wherein the glasses are liquid crystal shutter glasses consisting of a left eye glass and a right eye glass which are identically on/off in frame units under the control of the control unit to have the same transmissive characteristic.

8. The stereoscopic image display device of claim 1, wherein the left eye glass and the right eye glass have the same transmissive characteristic including a same polarization.

9. A driving method of a stereoscopic image display device, comprising:
    an input step of receiving an input of a user control signal from the outside;

an image processing step of creating either a left eye image or a right eye image as effective image information and the other image as ineffective image information, when the user control signal is input; and a display step of displaying the left eye image and the right eye image on an image panel, wherein the image displayed on the image panel is viewed through glasses including a left eye glass and a right eye glass which have the same transmissive characteristic; and wherein the image panel includes:

a panel for alternately displaying the left eye image and the right eye image in frame units; and an active retarder attached to the panel and having first polarization and second polarization which alternate with each other in frame units under the control of the control unit, wherein the left eye glass transmits only one of the left eye image and the right eye image as the effective image information displayed on the image panel, and the right eye glass transmits only the other one of the left eye image and the right eye image as the effective image information.

10. The driving method of claim 9, wherein the image processing step creates the ineffective image information using one of color information, image information and character information or a combination thereof which has a different format from the effective image information.

11. The driving method of claim 9, wherein the image processing step processes an image using any one or a combination of the gray scale compensation which compensates for a negative/positive gray scale of either the left eye image or the right eye image to create the image as ineffective image information, color gray scale compensation which compensates for a color gray scale of either the left eye image or the right eye image to create the image as ineffective image information, background character insertion which sets either the left eye image or the right eye image as a background and inserts a character into the background to create the image as ineffective image information, and selective area control which defines part of the image panel as a control area and creates either the left eye image or the right eye image, which is displayed in the control area, as ineffective image information.

12. The driving method of claim 9, wherein the stereoscopic image display device presents a stereoscopic image using one of a patterned retarder, the active retarder, and liquid crystal shutter glasses.

13. The driving method of claim 9, wherein the stereoscopic image display device displays either a 2D image or a 3D image, when the user control signal is not input.

14. The driving method of claim 9, wherein the left eye glass and the right eye glass have the same transmissive characteristic including a same polarization.

15. A stereoscopic image display device, comprising:

an image control unit for outputting an effective image and an ineffective image in frame units;

a panel for alternately displaying the effective image and the ineffective image; and an active retarder attached to the panel and having a first polarization and a second polarization which alternate with each other in frame units under the control of the control unit, wherein the control unit processes an image using any one or a combination of the gray scale compensation which compensates for a negative/positive gray scale of either a left eye image or a right eye image to create the image as ineffective image information, color gray scale compensation which compensates for a color gray scale of either the left eye image or the right eye image to create the image as ineffective image information, background character insertion which sets either the left eye image or the right eye image as a background and inserts a character into the background to create the image as ineffective image information, and selective area control which defines part of the image panel as a selective area and creates either the left eye image or the right eye image, which is displayed in the selective area, as ineffective image information, and supplies the image to the image panel; and glasses including a left eye glass and a right eye glass which have the same transmissive characteristic, wherein the left eye glass transmits only one of the left eye image and the right eye image as the effective image information displayed on the image panel, and the right eye glass transmits only the other one of the left eye image and the right eye image as the effective image information.

16. The stereoscopic image display device of claim 15, wherein the ineffective image information is composed of any one of color information, image information and character information or a combination thereof which has a different format from the effective image information.

17. The stereoscopic image display device of claim 15, wherein the panel separates the left eye image and the right eye image by odd-number lines and even-number lines and alternately displays the images in frame units.

18. The stereoscopic image display device of claim 15, wherein the left eye glass and the right eye glass have the same transmissive characteristic including a same polarization.

* * * * *